(12) United States Patent
Omata et al.

(10) Patent No.: US 6,583,592 B2
(45) Date of Patent: Jun. 24, 2003

(54) CONTROL APPARATUS FOR HYBRID VEHICLE

(75) Inventors: Yoshiaki Omata, Hamamatsu (JP); Kazuhiko Morimoto, Hamamatsu (JP)

(73) Assignee: Suzuki Motor Corporation, Hamamatsu (JP)

(*) Notice: Subject to any disclaimer, the term of this patent is extended or adjusted under 35 U.S.C. 154(b) by 0 days.

(21) Appl. No.: 09/921,494

(22) Filed: Aug. 3, 2001

(65) Prior Publication Data
US 2002/0014869 A1 Feb. 7, 2002

(30) Foreign Application Priority Data
Aug. 4, 2000 (JP) ........................................ 2000-237170

(51) Int. Cl.$^7$ ................................................ H02P 3/00
(52) U.S. Cl. ........................ 318/139; 318/143; 318/146; 318/157; 180/65.1; 180/65.2; 180/65.3; 180/65.4; 320/104; 320/123; 320/130; 320/132; 290/40
(58) Field of Search ................................. 318/139, 143, 318/146, 157; 180/65.1, 65.2, 65.3, 65.4; 320/104, 123, 127, 128, 130, 132; 290/40

(56) References Cited

U.S. PATENT DOCUMENTS

| 5,561,362 A | * | 10/1996 | Kawamura et al. ........... 320/48 |
|---|---|---|---|
| 5,623,194 A | * | 4/1997 | Boll et al. .................... 320/15 |
| 5,839,533 A | | 11/1998 | Mikami et al. |
| 5,841,201 A | | 11/1998 | Tabata et al. |
| 5,895,333 A | | 4/1999 | Morisawa et al. |
| 5,935,040 A | | 8/1999 | Tabata et al. |
| 5,945,808 A | * | 8/1999 | Kikuchi et al. ............. 320/132 |
| 6,034,510 A | * | 3/2000 | Kikuchi et al. ............. 320/148 |
| 6,048,289 A | * | 4/2000 | Hattori et al. ................ 477/15 |
| 6,053,842 A | * | 4/2000 | Kitada et al. .................. 477/5 |
| 6,057,671 A | | 5/2000 | Kuno |
| 6,083,138 A | * | 7/2000 | Aoyama et al. ................ 477/5 |
| 6,118,237 A | * | 9/2000 | Kikuchi et al. ............. 318/139 |
| 6,150,793 A | * | 11/2000 | Lesesky et al. ............. 320/104 |
| 6,215,198 B1 | * | 4/2001 | Inada et al. .................. 290/40 |
| 6,225,784 B1 | | 5/2001 | Kinoshita et al. |
| 6,232,744 B1 | * | 5/2001 | Kawai et al. ............... 320/132 |
| 6,252,377 B1 | | 6/2001 | Shibutani et al. |
| 6,329,772 B1 | * | 12/2001 | Ochiai et al. ............... 318/193 |

(List continued on next page.)

FOREIGN PATENT DOCUMENTS

| JP | 08-1420206 | * | 5/1996 | ............. B06L/3/00 |
|---|---|---|---|---|
| JP | 2000-23307 | | 1/2000 | |
| JP | 2000-92614 | | 3/2000 | |

Primary Examiner—Robert E. Nappi
Assistant Examiner—Tyrone Smith
(74) Attorney, Agent, or Firm—Flynn, Thiel, Boutell & Tanis, P.C.

(57) ABSTRACT

A control apparatus enhances charge and discharge performance of a main battery in a low temperature environment, extends the life of the main battery and improves the reliability of the whole system. The control apparatus is for a hybrid vehicle having an engine and an electric motor disposed therein. The electric motor has both driving and power-generating functions to directly connect to the engine mounted on the hybrid vehicle. The vehicle includes a main battery which supplies driving electric power to the electric motor and is charged by generated electric power from the electric motor. The vehicle includes a temperature sensor for detecting a temperature of the main battery. A controller controls to prohibit power-generation driving of the electric motor when a main battery temperature detected by the temperature sensor is under a set temperature, when the electric motor is operating in a power-generation driving mode, when an open-circuit voltage value of the main battery exceeds a set voltage value, and when a generated electric power value of the electric motor is less than a set electric power.

17 Claims, 6 Drawing Sheets

U.S. PATENT DOCUMENTS

| | | | |
|---|---|---|---|
| 6,333,612 B1 * | 12/2001 | Suzuki et al. | 318/432 |
| 6,334,079 B1 | 12/2001 | Matsubara et al. | |
| 6,335,574 B1 * | 1/2002 | Ochiai et al. | 290/40 |
| 6,345,216 B1 * | 2/2002 | Morimoto et al. | 701/22 |
| 6,348,771 B1 * | 2/2002 | Morimoto et al. | 318/139 |
| 6,362,580 B1 * | 3/2002 | Omata et al. | 318/139 |
| 6,369,539 B1 * | 4/2002 | Morimoto et al. | 318/369 |
| 6,373,206 B1 * | 4/2002 | Morimoto et al. | 318/139 |
| 6,382,335 B2 | 5/2002 | Takashima et al. | |

* cited by examiner

FIG.2

A : PREDETERMINED ELECTRIC POWER VALUE

B : POWER-GENERATION DRIVING IS RESTARTED BECAUSE DROPPED UNTIL A PREDETERMINED OPEN-CIRCUIT VOLTAGE VALUE

C : VOLTAGE RISES WITH POWER-GENERATION RESTART

D : POWER-GENERATION IS DAMPED BY VOLTAGE LIMIT CONTROL

CONTROL APPARATUS FOR HYBRID VEHICLE

FIELD OF THE INVENTION

This invention relates to a control apparatus for a hybrid vehicle, and particularly to a control apparatus for a hybrid vehicle that controls charge and discharge performance of a main battery in a low temperature environment. The control apparatus extends the life of the main battery and improves the reliability of the entire control system.

BACKGROUND OF THE INVENTION

Some motor vehicles are of a type commonly called a hybrid vehicle having an engine and an electric motor disposed therein as the power sources of a propulsion system. The engine mounted on the hybrid vehicle is provided to directly connect with an electrical motor having a vehicle driving function and an electrical power generating function. This hybrid vehicle has a control apparatus to control both driving and power-generating states of the electric motor based on a driving state of the hybrid vehicle and a driving state of the engine.

Control apparatus of a hybrid vehicle supplies drive electric power to an electric motor and establishes a main battery charged by generated electric power from the electric motor. When a quantity of charge of the main battery (defined "SOC") becomes 0%, the control apparatus cannot drive the electric motor. When a quantity of charge of the main battery becomes 100%, the control apparatus cannot receive power-generation electricity from the electric motor. Accordingly, the control apparatus controls both driving and power-generating states so that a quantity of charge of the main battery is maintained in one limit or within a predetermined range.

In the main battery, there is a problem because the electric charge and discharge performances deteriorate when the main battery temperature goes low in a low temperature environment. The control apparatus needs to administer main battery temperature so that the electric charge and discharge performances do not deteriorate.

One such example of a control apparatus for a hybrid vehicle is disclosed in published Japanese Application Laid-Open No. 2000-92614 and published Japanese Application Laid-Open No. 2000-23307.

The control apparatus disclosed in published Japanese Application Laid-Open No. 2000-92614 controls a charge state of a battery to obtain in a predetermined temperature state. Specifically, when battery temperature is lower than the predetermined temperature, this control apparatus forcibly executes electric charge and discharge in the predetermined battery charge limits, and raises battery temperature by heat generated from this electric charge and discharge.

The control apparatus disclosed in published Japanese Application Laid-Open No. 2000-23307 starts up an engine by supplying electric power from a battery to a motor and executes driving of the motor by supplying electric power from the battery to the motor after engine start-up which causes battery temperature to rise. This occurs even after an engine is started for performing the power running operation of the motor when battery temperature is equal to or less than a predetermined value, when internal resistance of the battery is equal to or more than a predetermined value, when a charge state of the battery is equal to or more than a predetermined value, and when engine coolant temperature is equal to or less than a predetermined value as well.

However, the control apparatus indicated in the disclosure detects a charge state (SOC) of the main battery and administers electric charge and discharge of the main battery in either case, in order to avoid reduction of the electric charge and discharge of the main battery in a low temperature environment.

Accordingly, in the control apparatus indicated in the disclosure, in order to provide a means to detect a charge state (SOC) of the main battery, the system becomes complicated. There is a problem because of a rise in cost.

In order to obviate or minimize the above problem, the present invention provides a control apparatus for a hybrid vehicle having an engine and an electric motor disposed therein. The electric motor has both driving and power-generating functions to directly connect to the engine mounted on the hybrid vehicle. The hybrid vehicle includes a main battery which supplies driving electric power to the electric motor and is charged by generated electric power from the electric motor; a temperature sensor for detecting a temperature of the main battery; and a control means which controls to prohibit power-generation driving of the electric motor when a main battery temperature detected by the temperature sensor is under a set temperature, when the electric motor is power-generation driving, when an open-circuit voltage value of the main battery exceeds a set voltage value, and when a generated electric power value of the electric motor is under a set electric power.

A control apparatus of a hybrid vehicle of the invention controls to prohibit power-generation driving of the electric motor when a main battery temperature detected by the temperature sensor is under a set temperature, when the electric motor is used during power-generation driving, when an open-circuit voltage value of the main battery exceeds a set voltage value, and when a generated electric power value of the electric motor is under a set electric power. By this arrangement, the system does not need a means to detect a charge state of the main battery, can efficiently charge and discharge the main battery in the low temperature environment, and can well maintain a charge acceptance of the main battery.

DETAILED DESCRIPTION OF THE INVENTION

Figure 3:
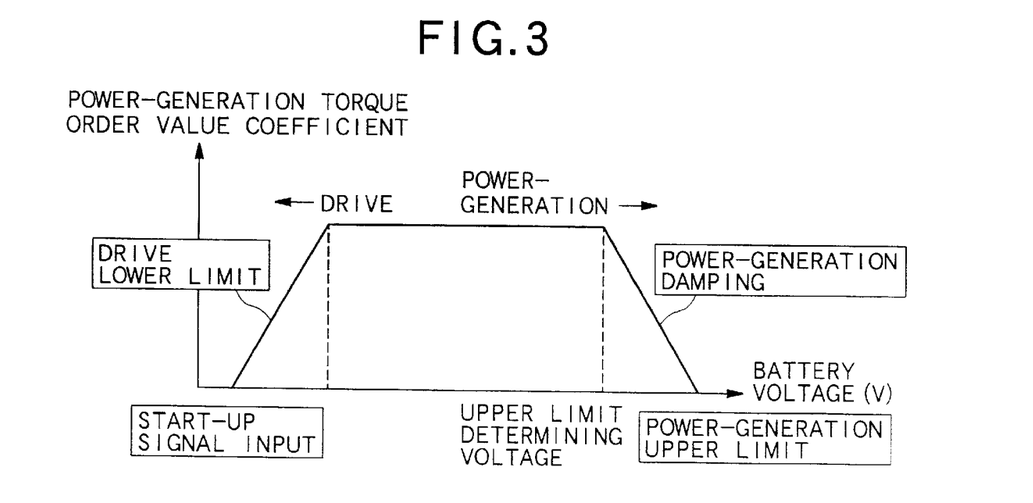
FIG. 3 is a diagram showing a control state for a main battery.
Figure 4:
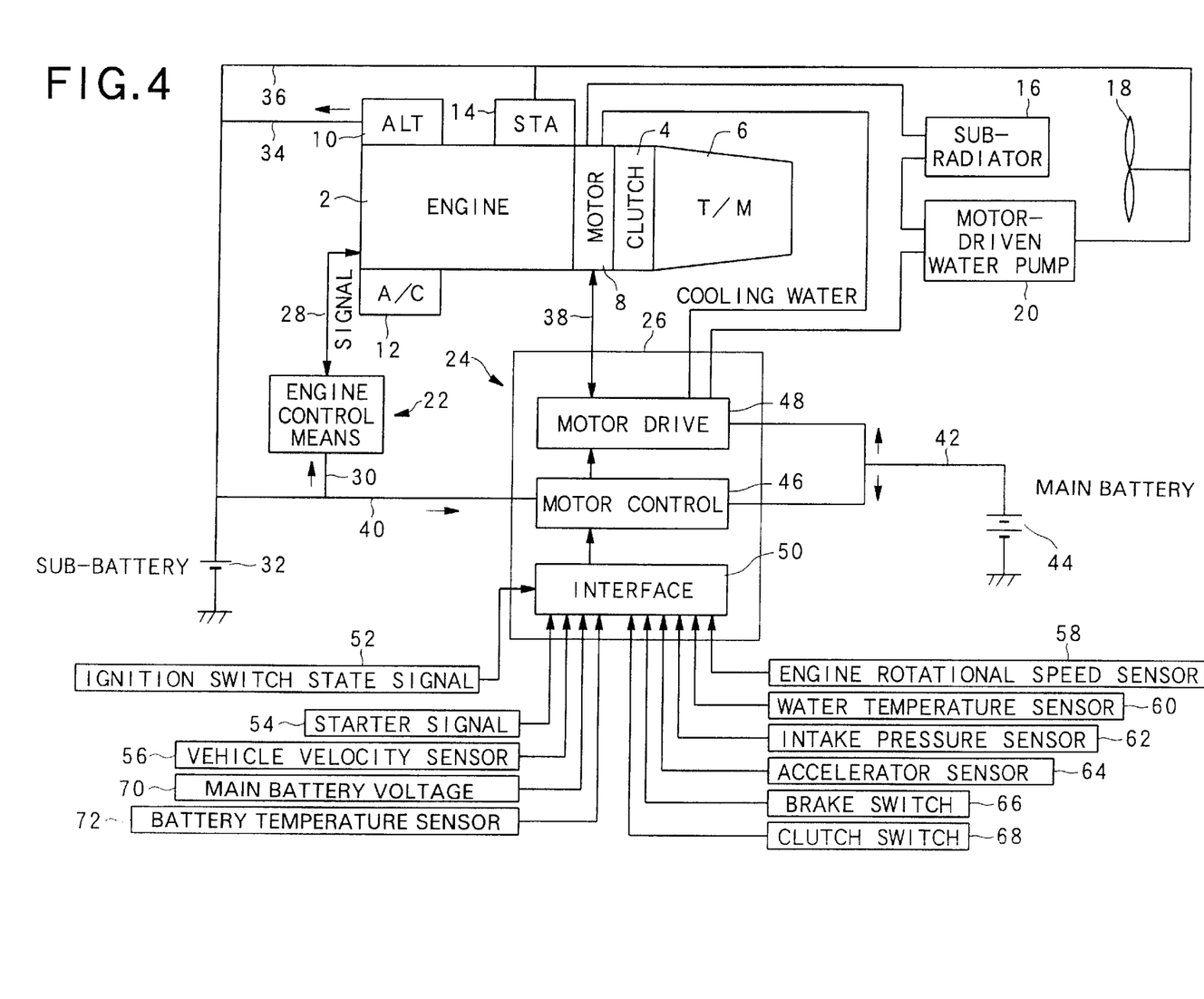
FIG. 4 is a block diagram showing a system for a control apparatus of a hybrid vehicle.

An explanation will be given of embodiments according to the invention in reference to the drawings as follows. FIGS. 1–5 show a first embodiment of the invention. FIG. 4 shows an engine 2 mounted on a vehicle (not shown), a clutch 4, and a manually operated transmission 6. The transmission 6 is directly connected to the engine 2 through the clutch 4. The transmission 6 builds in a gearing gear of more than one-grade, for example, a gearing gear of a five-grade system (not shown).

An electric motor 8 (hereafter described as a "motor") having a driving function and a power generating function is directly connected to the engine 2. The motor 8, as shown in FIG. 4, is directly connected to a side of a flywheel of a crank shaft (not shown) of the engine 2. Incidentally, the motor 8 may be directly connected to a side of a crank sprocket of the crank shaft (not shown). The motor 8 has a rotor and a stator coil.

The engine 2 includes an alternator 10 for power-generation, an air-compressor 12 for an air-conditioner, a starter motor 14 for starting up the vehicle, a sub-radiator fan 18 of a sub-radiator 16 for cooling the motor 8, and an electrically-driven water pump 20. The alternator 10 and the air compressor 12 are connected to the crank shaft by pulleys and belts (not shown). The starter motor 14 is connected to the flywheel by an engageable and disengageable pinion and ring gear (not shown).

The engine 2 mounted on the hybrid vehicle is controlled by an engine control means 22. The motor 8 mounted on the hybrid vehicle is controlled in a driving mode and power generation mode by a motor control means 26 of a control apparatus 24.

The engine 2 connects to the engine control means 22 through an engine-controlling signal line 28. "Line" is used herein to describe any electrical signal conduit. The engine control means 22 is linked to a sub-battery 32 through an engine control means-dedicated power line 30. The sub-battery 32 is coupled to the alternator 10 through a sub-battery-charging power line 34, and to the starter motor 14 and sub-radiator fan 18 and electric water pump 20 through a sub-battery-driving power line 36. The sub-battery 32 is charged by generated electric power from alternator 10, and supplies driving electric power to the starter motor 14, sub-radiator fan 18 and electrically-driven water pump 20. The sub-battery 32 is a conventional 12-volt vehicle battery.

The motor 8 is connected to the motor control means 26 through a motor-controlling signal line 38. The motor control means 26 is linked to the sub-battery 32 through a motor control means-dedicated sub-power line 40. The motor control means 26 also is coupled to a main battery 44 through a motor control means-dedicated main power line 42. The main battery 44 supplies driving electric power to the motor 8 and is charged by generated electric power from the motor 8.

An engine control means 22 for controlling the engine 2 has a fuel injection control section, an ignition time control section and the like, which are not illustrated. The engine control means 22 controls a quantity of fuel injected and the ignition time of engine 2 according to a driving state by a signal input from an engine rotational speed sensor 58, and a water temperature sensor 60 mentioned later.

The motor control means 26 to control the motor 8 includes motor control section 46, motor drive section 48, input/output processing section (interface) 50 and the like.

The motor control means 26 connects to ignition switch 52, starter switch 54, vehicle velocity sensor 56, engine rotational speed sensor 58, water temperature sensor 60, intake pressure sensor 62, accelerator sensor 64, brake switch 66, clutch switch 68, main battery voltage detector 70 for detecting an open-circuit voltage of the main battery 44, and temperature sensor 72 for detecting a temperature of the main battery 44 at an input side. The motor control means 26 connects to motor 8 at an output side.

The motor control means 26, by a signal input from ignition switch 52 and main battery voltage detector 70, controls both driving and power-generating states of motor 8 based on a driving state of a hybrid vehicle and a driving state of engine 2.

Figure 5:
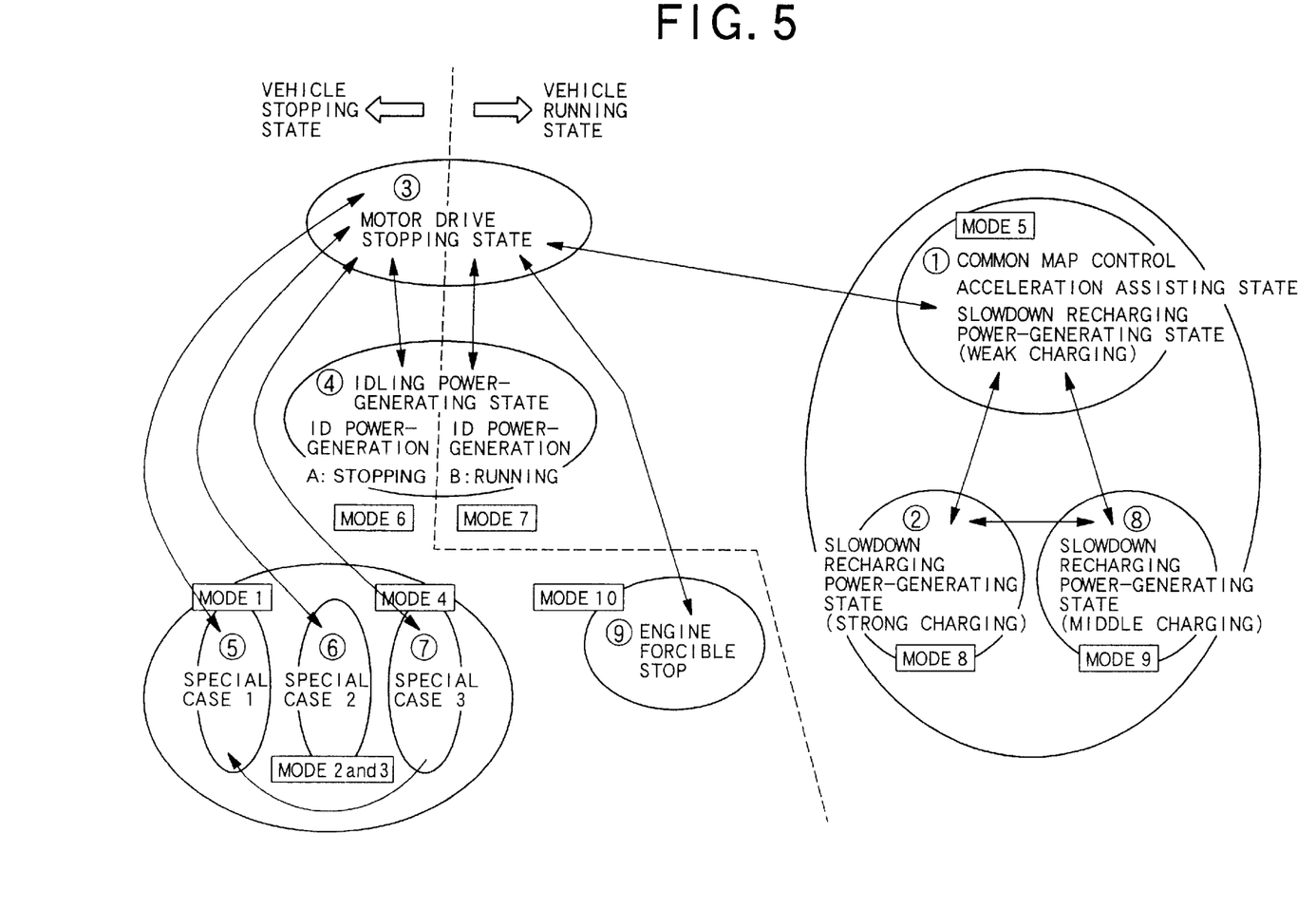
FIG. 5 is a diagram showing switchover of a control state.

Control states (modes) of motor 8 for motor control means 26, as shown in FIG. 5, are the following nine kinds.

(1) common map for acceleration assist and slowdown recharging power generation control (weak charging): mode 5;

(2) slowdown recharging power-generating control (strong recharging): mode 8;

(3) motor driving stop control (state waiting whether each switchover condition is satisfied);

(4) idling power-generating control: mode 6 (A: during stop) and mode 7 (B: during running);

(5) special case control 1 (starting assist): mode 1;

(6) special case control 2 (start-up assist): mode 2 (waiting) and mode 3 (executing);

(7) special case control 3 (idle rotational speed stabilization assist): mode 4;

(8) medium recharging power-generating control: mode 9; and (9) engine forcible stop control: mode 10.

Switchover of the control states, based on a driving state of a vehicle, is executed as follows.

1. During execution of control states (1), (2), (4) and (8), when conditions for switching over to control states (5), (6), (7) and (9) are satisfied, the control states of (1), (2), (4) and (8) are removed forcibly, and the control states of (5), (6) and (7) are switched over through motor driving stop state of control state (3).

2. Special case control 1 and 2 (control states (5) and (6)) do not directly switch over to other special case control 3 (control state (7)).

3. After being switched over, control states (5), (6), (7) and (9) do not switch over to other control conditions until a removing condition is satisfied. But, in special case control 3 (state (7)), when a switchover condition to special case control 1 (state (5)) is satisfied before a removing condition is satisfied, the special case control 3 is switched over to special case control 1 (state (5)).

By this means, the motor control means 26, by a signal input from ignition switch 56 and main battery voltage detector 70, controls both driving and power-generating states of motor 8 according to various control state based on a driving state of a hybrid vehicle and a driving state of the engine 2.

The control apparatus 24 for a hybrid vehicle supplies driving electric power to motor 8. In order to prevent over-charge and over-electric discharge of main battery 44 charged by generated electric power from motor 8, as shown in FIG. 3, the control apparatus 24 sets a drive power-generation domain with limits for a power-generation torque order value coefficient of motor 8 by using a lower voltage value and an upper limit-determining voltage value for the main battery voltage. The control apparatus 24, in a domain under the lower voltage value of the drive power-generation domain, controls driving of the motor 8 so as to damp gradually, and in a domain that exceeds the upper limit-determining voltage value of this drive power-generation domain, controls power-generation driving of the motor 8 to damp gradually.

In the domain that exceeds the upper limit-determining voltage value of the drive power-generation domain, the reason to damp with driving power-generation of the motor 8 is so that the voltage of the main battery runs up to an upper limit-determining voltage value resulting in having provided a terminal voltage with even a minute or miniscule electric current due to increase of internal resistance of the main battery 44, in particular when main battery temperature is low temperature. When further charge of the main battery 44 is continued by power-generation drive with motor 8 in the state that reaches an upper limit-determining voltage value, and internal resistance of main battery 44 has increased further, then it is hard to further charge the battery. As a result, there is a problem with the charge efficiency. Main battery 44 can be charged by a minute or small electric current for a long time. However, for a hybrid vehicle, such an operation is not effective when the main battery needs to be charged for a short time with a limited opportunity.

So, as shown in FIG. 4, control apparatus 24 of the hybrid vehicle is connected to main battery voltage detection device 70 to detect an open-circuit voltage of main battery 44 and is connected to battery temperature sensor 72 to detect the temperature of the main battery 44.

The motor control means 26 controls to prohibit power-generation driving of the motor 8 when the main battery temperature detected by temperature sensor 72 is under a set temperature, when the motor 8 is operating during power-generation driving, when an open-circuit voltage value of the main battery 44 exceeds a set voltage value, and when a generated electric power value of the motor 8 is under a set electric power. Incidentally, the generated electric power value is calculated from a power-generation torque value of the motor 8.

Further, the motor control means 26 controls to cancel power-generation driving prohibition of the motor 8 when an open-circuit voltage value of the main battery 44 has become lower than a canceling voltage value that is lower than a set voltage value, during power-generation driving prohibition of the motor.

Figure 1:
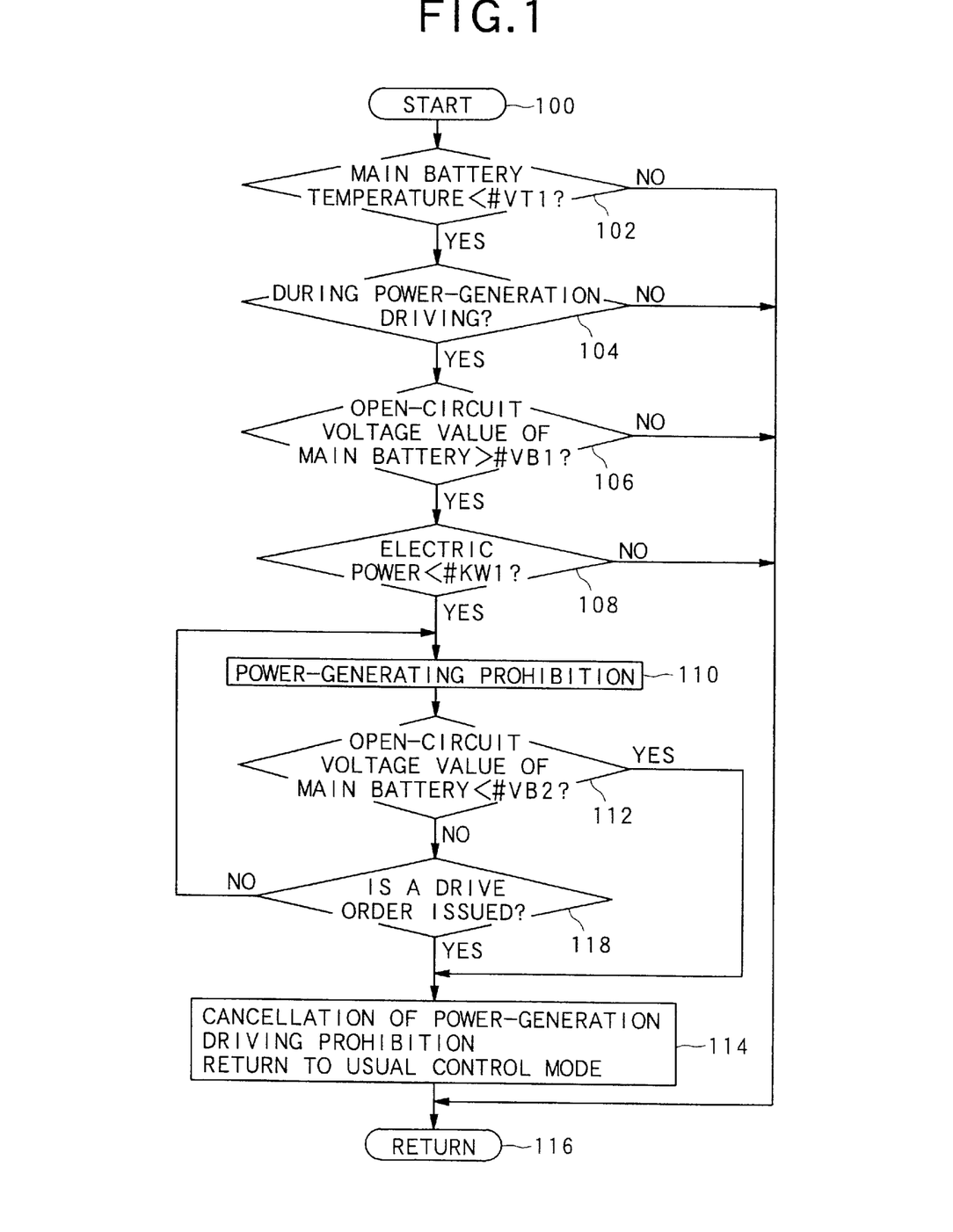
FIG. 1 is a control flowchart for a control apparatus of a first embodiment of the present invention.

Operation of this embodiment is now described. Referring now to FIG. 1, when the control apparatus 24 for a hybrid vehicle starts control at step 100 by motor control means 26, then a determination is made at step 102 as to whether a main battery temperature VT is less than a set temperature #VT1. When the determination in step 102 results in YES, then a determination is made at step 104 as to whether motor 8 is currently power-generating. When the determination in step 104 is YES, then a determination is made at step 106 as to whether an open-circuit voltage value VB of main battery 44 is greater than an upper limit-determining voltage value #VB1 (see FIG. 2) that is a set voltage value. When the determination in step 106 is YES, then a determination is made at step 108 as to whether a generated electric power value KW of motor 8 is under or less than a set electric power value #KW1.

When the determination in step 108 is YES, then power-generation driving is prohibited at step 110. If the determination in any of steps 102 to 108 is NO, then the routine is returned to step 116.

During power-generation driving prohibition of the motor 8 at step 110, a determination is made at step 112 as to whether an open-circuit voltage value VB2 of main battery 44 has become less than a canceling voltage value #VB2 that is lower than a upper limit-determining voltage value #VB1.

When the determination in step 112 is YES, then the power-generation driving prohibition is cancelled, and the routine is returned to usual control mode at step 114, and returned at step 116. When the determination in step 112 is NO, then a determination is made at step 118 as to whether a driving order for drive motor 8 has been issued. When the determination in step 118 is NO, then the routine is returned to step 110 for processing of the power-generation driving prohibition. When the determination in step 118 is YES, then the routine goes to step 114. Immediately after the power-generation driving prohibition has been cancelled at step 114, the control mode is returned to an usual control mode. The routine is returned to step 116.

Figure 2:
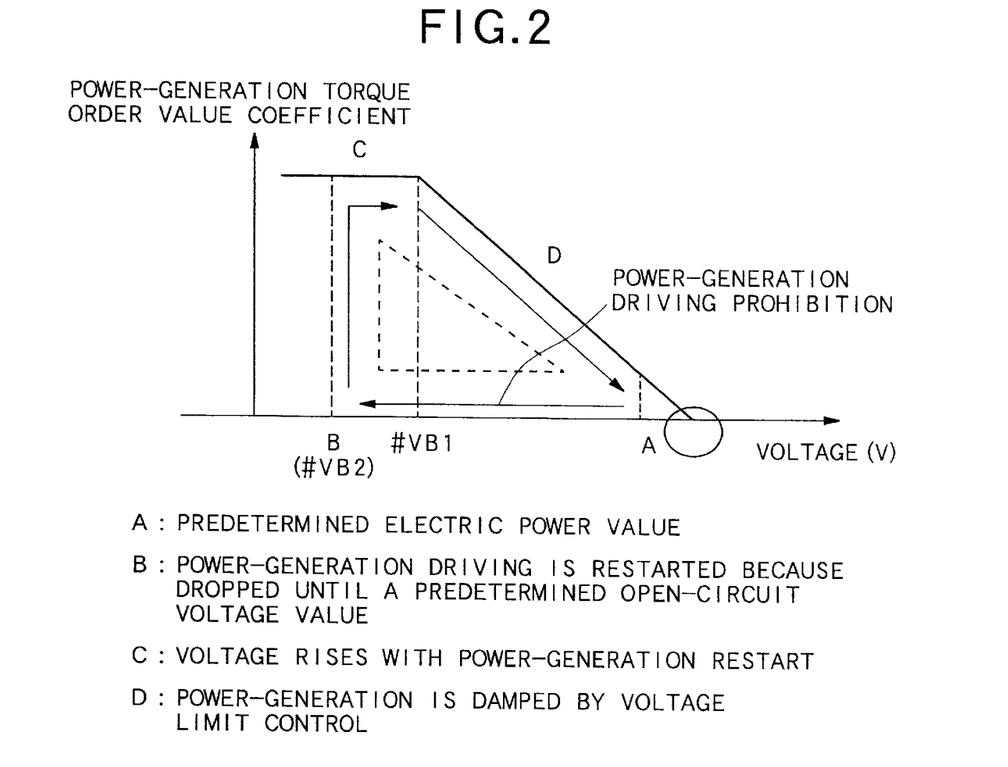
FIG. 2 is a diagram showing a control state for a main battery at low temperature.

As shown in FIG. 2, the control means 26 prohibits power-generation driving (state A) when the main battery temperature VT is less than a set temperature #VT1, when the motor 8 is currently power-generating, when an open-circuit voltage value VT exceeds a set upper limit-determining voltage value #VB1, and when a generated electric power value KW of motor 8 is less than a set electric power #KW1. The control apparatus 24 controls to cancel power-generation driving prohibition, and to reopen power-generation driving (state B) when open-circuit voltage value VB drops because of power-generation driving prohibition to a value less than canceling voltage value #VB2. Canceling voltage value #VB2 is lower than upper limit-determining voltage value #VB1.

By reopening power-generating by the motor 8, the control apparatus 24 increases the open-circuit voltage value VB which reaches upper limit-determining voltage value #VB1 (state C) and then exceeds voltage value #VB1 Then the control apparatus 24 controls so as to damp power-generation driving of the motor 8 (state D). Afterwards, "state A" to "state D" are again repeated.

Thus, the motor control apparatus 24 for a hybrid vehicle controls to prohibit power-generation driving of the motor 8, by the motor control means 26 when the main battery temperature VT is less than a set temperature #VT1, when the motor 8 is power-generation driving, when an open-circuit voltage value VB of main battery 44 exceeds an upper limit-determining voltage value #VB1, and when a generated electric power value KW of the motor 8 is less than a set electric power #KW1 By this means, this system does not need a means to detect a charge state of the main battery 44. The system can efficiently charge and discharge the main battery 44 in the low temperature environment, and can maintain an acceptable charge for the main battery 44.

Accordingly, the control apparatus 24 of a hybrid vehicle can provide charge and discharge performance of main battery 44 in the low temperature environment, can extend life of the main battery 44 and can improve the reliability of whole system by extending the life of the main battery.

Further, the control apparatus 24 controls to cancel power-generation driving prohibition of motor 8 when an open-circuit voltage value VB of the main battery 44 has become less than a canceling voltage value #VB2 that is lower than an upper limit-determining voltage value #VB1, during power-generation driving prohibition of the motor 8.

Accordingly, this control apparatus 24 for a hybrid vehicle can execute power-generation driving prohibition by only sensing or watching open-circuit voltage value VB of main battery 44, and by making the control of power-generation driving prohibition and power-generation driving permission possible with a simple, quick system. As stated earlier, this control apparatus 24 does not need a means to detect a charge state (SOC) of the main battery 44. As a result, this system can extend life of the main battery 44, and can improve the reliability of the whole system because of simplification of the system and extended life of the main battery 44.

Figure 6:
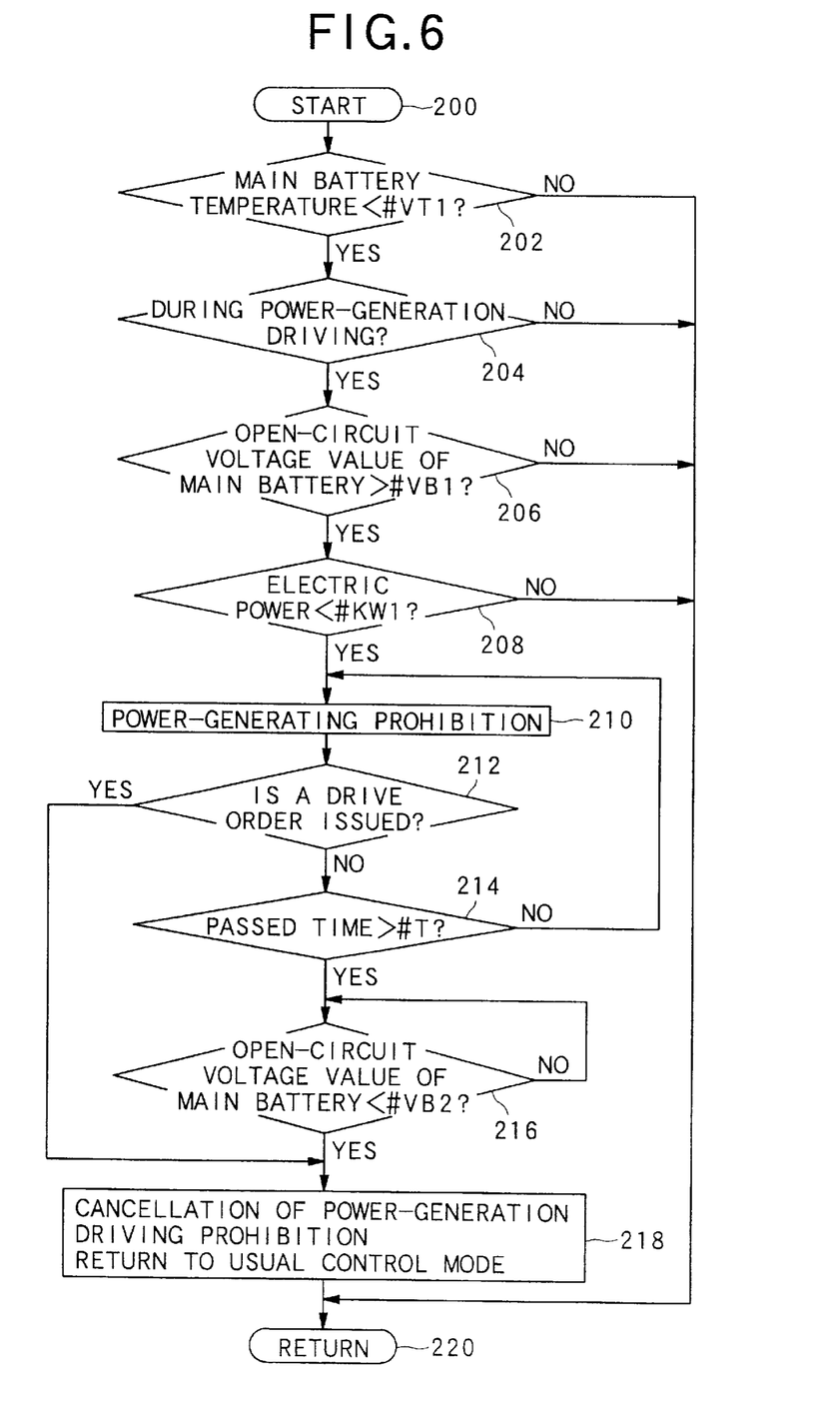
FIG. 6 is a control flowchart of a control apparatus for a hybrid vehicle showing a second embodiment of the present invention.

FIG. 6 shows a second embodiment. A control apparatus 24 of the second embodiment controls to prohibit power-generation driving of the motor 8 on the basis of main battery temperature VT and open-circuit voltage value VB of the main battery 44. The control apparatus 24 sets a set time #T for continuation time T of this power-generation driving prohibition of the motor 8. And within this set time #T, a determination is made as to whether open-circuit voltage value VB of the main battery 44 becomes less than a canceling voltage value #VB2, and the control apparatus 24 controls to cancel power-generation driving prohibition of the motor 8.

When the control means 26 in the second embodiment starts control at step 200, then a determination is made at step 202 as to whether a main battery temperature VT is less than a set temperature #VT1. When the determination in step 202 results in YES, then a determination is made at step 204 as to whether the motor 8 is operating in a power-generation mode. When the determination in step 204 is YES, then a determination is made at step 206 as to whether an open-circuit voltage value VB of the main battery 44 exceeds an upper limit-determining voltage value #VB1 (see FIG. 2) that is a set voltage value. When the determination in step 206 is YES, then a determination is made at step 208 as to whether a generated electric power value KW of motor 8 is under a set electric power value #KW1.

When the determination in step 208 is YES, then power-generation driving is prohibited at step 210. When any of the determinations in steps 202 to 208 is NO, then the routine is returned to step 220.

During power-generating prohibition of the motor 8 at step 210, a determination is made at step 212 as to whether a driving order for the motor 8 has been issued. When the determination in step 212 is YES, then the routine goes to step 218, and immediately the power-generation driving prohibition is cancelled. Then the control mode is returned to the usual control mode and the routine is returned at step 220. When the determination in step 212 is NO, then a determination is made at step 214 as to whether a continuation time T of power-generation driving prohibition of motor 8 exceeds a set predetermined time #T.

When the determination in step 214 is NO, then the routine is returned to step 210 for processing or maintaining power-generating prohibition. When the determination in step 214 is YES, a determination is made at 216 as to whether open-circuit voltage value VB is less than canceling voltage value #VB2 (see FIG. 2), which is lower than upper limit-circuit voltage value #VB1. When the determination in step 216 is NO, then the determination in step 216 is repeated. When the determination in step 216 is YES, then the routine goes to step 218, which cancels the power-generating prohibition. The control mode returns to the usual control mode. The routine is returned at step 220.

Thus, the motor control apparatus 24 for a hybrid vehicle in the second embodiment controls to prohibit power-generation driving of the motor 8 by the motor control means 26 when the main battery temperature VT is under a set temperature #VT1, when the motor 8 is operating in a power-generation mode, when an open-circuit voltage value VB of the main battery 44 exceeds an upper limit-determining voltage value #VB1, and when a generated electric power value KW of the motor 8 is under a set electric power #KW1. By this means, this system, as in the first embodiment, can efficiently charge and discharge the main battery 44 in a low temperature environment, and can maintain an acceptable charge for the main battery 44.

In addition, the control apparatus 24 of the hybrid vehicle sets a predetermined set time #T for continuation time T for power-generation prohibition of the motor 8. When open-circuit voltage value VB of the main battery 44 begins to drop because of power-generation driving prohibition and becomes less than canceling voltage value #VB2 within the set time #T, then after the set time #T passes, the control apparatus 24 controls to cancel the power-generation prohibition of the motor 8 and starts power-generating driving. Meanwhile, when an open-circuit voltage value VB does not become less than the canceling voltage VB2 within the set time #T, then after the set time #T passes, the control apparatus waits until an open-circuit voltage value VB has become less than the canceling voltage VB2. Then the control apparatus 24 controls to cancel power-generating prohibition for the motor 8 and starts power-generation driving. However, during the power-generation driving prohibition time period #T, when a drive driving order has been issued, then the control apparatus 24 controls to cancel the power-generation driving prohibition and returns to the usual control mode.

Accordingly, the control apparatus 24 of the hybrid vehicle can execute power-generation driving prohibition by watching or detecting only open-circuit voltage value VB of main battery 44, and by making the control of power-generation driving prohibition and power-generation driving permission possible with a simple, quick system. As stated earlier, this control apparatus 24 does not need a means to detect a charge state (SOC) of the main battery 44. As a result, this system can extend life of the main battery 44, and can improve the reliability of the whole system because of simplification of the system and extended life for the main battery 44.

Figure 7:
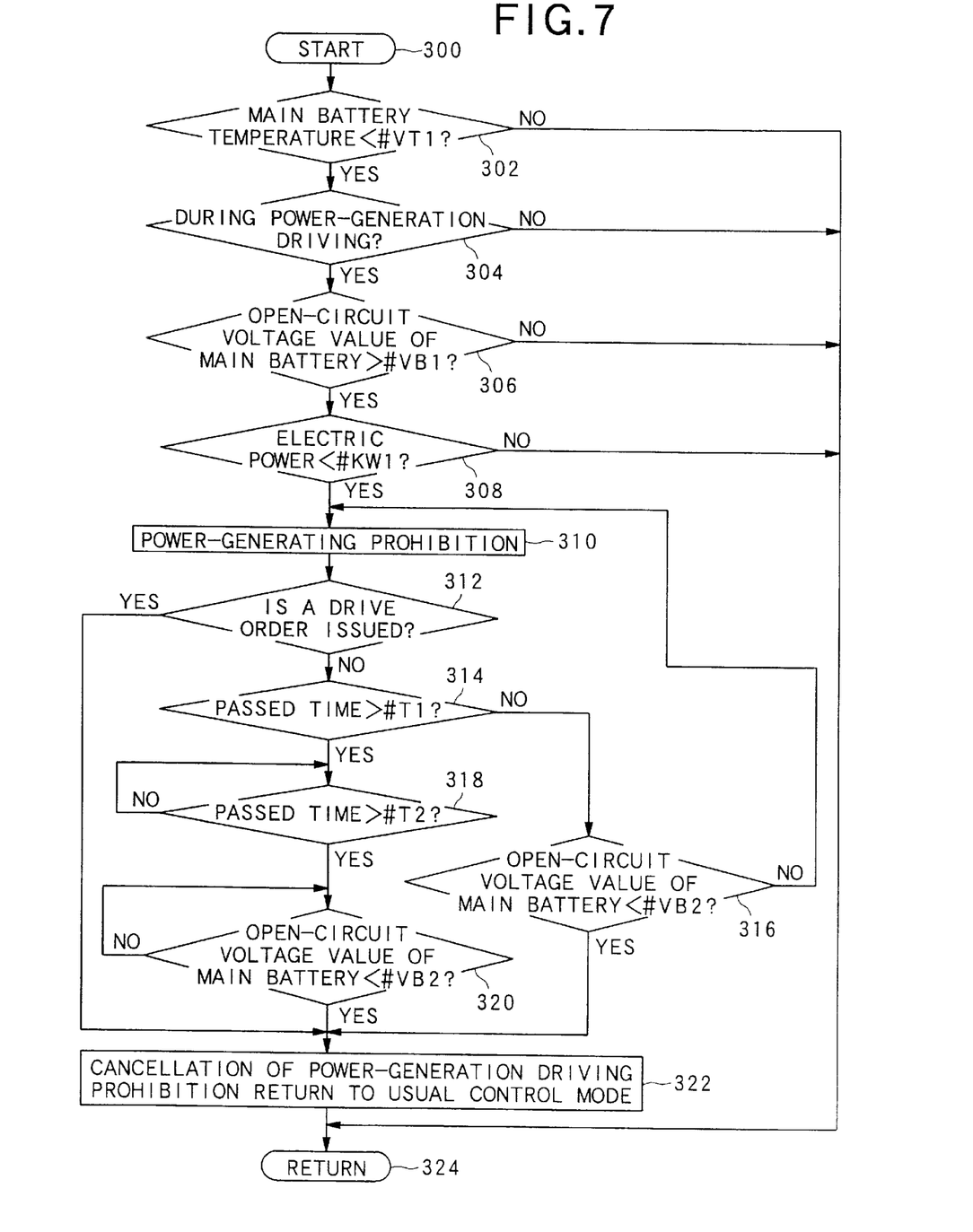
FIG. 7 is a control flowchart of a control apparatus for a hybrid vehicle showing a third embodiment of the present invention.

FIG. 7 shows a third embodiment of the invention. A control apparatus 24 of the third embodiment controls to prohibit power-generation driving of the motor 8 on the basis of main battery temperature VT and open-circuit voltage value VB of the main battery 44. The control apparatus 24 sets a first set time #T1 and a second set time #T2 for continuation time T for the power-generation driving prohibition of the motor 8. Within these first and second set times #T1 and #T2, a determination is made as to whether open-circuit voltage value VB of the main battery 44 becomes less than a canceling voltage value #VB2, and the control apparatus 24 controls to cancel power-generating prohibition of motor 8.

The control means 24 in the third embodiment starts control at step 300. Then a determination is made at step 302 as to whether a main battery temperature VT is less than a set temperature #VT1. When the determination in step 302 results in YES, then a determination is made at step 304 as to whether motor 8 is operating in a power-generating mode or state. When the determination in step 304 is YES, then a determination is made at step 306 as to whether an open-circuit voltage value VB of main battery 44 exceeds an upper limit-determining voltage value #VB1 (see FIG. 2) that is a set voltage value. When the determination in step 306 is YES, then a determination is made at step 308 as to whether a generated electric power value KW of the motor 8 is less than a set electric power value #KW1.

When the determination in step 308 is YES, then power-generation driving is prohibited at step 310. When the determination in any of steps 302 to 308 is NO, then the routine is returned to step 324.

During power-generating prohibition of the motor 8 at step 310, a determination is made at step 312 as to whether a drive driving order for the drive motor 8 has been issued. When the determination in step 312 is YES, then the routine goes to step 322 and immediately cancels the power-generation driving prohibition and returns the control mode to the usual control mode. Then the routine is returned at step 324. When the determination in step 312 is NO, then a determination is made at step 314 as to whether a continuation time T of power-generation driving prohibition of motor 8 exceeds a first set time #T1.

When the determination in step 314 is NO, a determination is made at step 316 as to whether open-circuit voltage value VB is less than canceling voltage value #VB2 (see FIG. 2). Canceling voltage value #VB2 is lower than upper limit-circuit voltage value #VB1. When the determination in step 316 is NO, then the routine is returned to step 310 for processing of power-generation driving prohibition. When the determination in step 316 is YES, then the routine goes to step 322, which cancels the power-generation driving prohibition and returns the control mode to the usual control mode. The routine then returns at step 324.

When the determination in step 314 is YES, then a determination is made at step 318 as to whether continuation time T of the power-generation prohibition of the motor 8 exceeds a second set time #T2 that is longer than the first set time #T1. When the determination in step 318 is NO, then the determination in step 318 is repeated. When the determination in step 318 is YES, a determination is made at step 320 as to whether open-circuit voltage value VB is less than canceling voltage value #VB2 (see FIG. 2), which is lower than upper limit-circuit voltage value #VB1.

When the determination in step 320 is NO, then the determination in step 320 is repeated. When the determination in step 320 is YES, then the routine goes to step 322. Immediately after the power-generation driving prohibition has been cancelled at step 322, the control mode is returned to usual control mode. The routine is returned at step 324.

Thus, the motor control means 24 for a hybrid vehicle in the third embodiment controls to prohibit power-generation driving of motor 8 by the motor control means 26 when the main battery temperature VT is under a set temperature #VT1, when the motor 8 is performing power-generation driving, when an open-circuit voltage value VB of the main battery 44 exceeds an upper limit-determining voltage value #VB1, and when a generated electric power value KW of the motor 8 is less than a set electric power #KW1. By this means, this system, as in both of the first and second embodiments, can efficiently charge and discharge main battery 44 in a low temperature environment, and can maintain an acceptable charge for main battery 44.

In addition, the control apparatus 24 of the hybrid vehicle sets both first and second set times #T1 and #T2 for continuation time T of power-generation driving prohibition of the motor 8. When open-circuit voltage value VB of the main battery 44 begins to drop because of power-generation driving prohibition and becomes less than canceling voltage value #VB2 within the first set time #T1, then the control apparatus 24 controls to cancel power-generation driving prohibition of the motor 8 and start power-generation driving. When open-circuit voltage value VB becomes less than canceling voltage value #VB2 within second set time period #T2, which is longer than first set time #T1, then after the second set time #T2 passes, the control apparatus 24 controls to cancel power-generation driving prohibition for the motor 8 and start power-generation driving. Meanwhile, when an open-circuit voltage value VB does not become less than the canceling voltage VB2 within the second set time period #T2, then after the second set time period #T2 passes, the control apparatus 24 controls to maintain power-generation driving prohibition of the motor 8 until the open-circuit voltage value VB becomes less than canceling voltage value #VB2. When an open-circuit voltage value VB has become less than the canceling voltage VB2, then the control apparatus 24 controls to cancel the power-generating prohibition of the motor 8 and starts power-generation driving. But, during the power-generating prohibition, when a motor driving order has been issued to drive the engine, then the control apparatus 24 controls to cancel the power-generation driving prohibition and to return to the usual control mode.

Accordingly, this control apparatus 24 for a hybrid vehicle can execute power-generating prohibition by sensing only the open-circuit voltage value VB of main battery 44, and by making the control of power-generation driving prohibition and power-generation driving permission possible with a simple, quick system. As stated earlier, this control apparatus 24 does not need a means to detect a charge state (SOC) of the main battery 44. As a result, this system can extend life of the main battery 44, and can improve the reliability of the whole system because of simplification of the system and extended life for the main battery 44.

Furthermore, this invention is not limited to the above-mentioned embodiments, but is suitable to many possible innovations and applications. For example, by having the control apparatus 24 execute positive driving of the motor 8 during power-generation driving prohibition of the motor, the control apparatus 24 can improve fuel efficiency of the engine 2, can quickly drop the open-circuit voltage value VB of the main battery 44 so as to become less than a canceling voltage #VB2 and can quickly reopen power-generation driving by the motor 8.

Besides, by sensing a reduction state of main battery temperature VT with a temperature sensor 72, predicting a state that is difficult to charge due to increase of internal resistance, and charging the main battery 44 and letting the temperature of the main battery rise by positive power-generation driving before main battery temperature VT drops to less than a set temperature #VT1, the control apparatus 24 can maintain an acceptable charge for the main battery 44.

Thus, the control apparatus of the hybrid vehicle does not need a means to detect a charge state of the main battery 44, can efficiently charge and discharge the main battery 44 in a low temperature environment, and can well maintain an acceptable charge for the main battery.

Accordingly, the control apparatus 24 of a hybrid vehicle can provide charge and discharge performance for the main battery 44 in a low temperature environment and can improve the reliability of the whole system by extending the life of the main battery.

What is claimed is:

1. A control apparatus for a hybrid vehicle having an engine and an electric motor disposed therein, the electric motor having both driving and power-generating functions and being directly connected to the engine mounted on the hybrid vehicle, comprising:

a main battery which supplies driving electric power to said electric motor and is charged by generated electric power from said electric motor;

a temperature sensor for detecting a temperature of the main battery; and a controller that controls to prohibit power-generation driving by said electric motor, wherein 1) when the main battery temperature detected by said temperature sensor is less than a set temperature, 2) when said electric motor is power-generation driving to charge said main battery, and 3) when an open-circuit voltage value of said main battery exceeds a set voltage value, then a power-generation torque order value is reduced gradually, and then, when a generated electric power value of said electric motor is less than a set electric power value, said controller controls to prohibit power-generation driving of said electric motor.

2. The control apparatus for a hybrid vehicle as defined in claim 1, wherein said controller controls to cancel the power-generation driving prohibition of said electric motor when the open-circuit voltage value of said main battery becomes less than a canceling voltage value, said canceling voltage value being less than the set voltage value, during the power-generation driving prohibition of said electric motor.

3. The control apparatus for a hybrid vehicle as defined in claim 1, wherein said controller sets a set predetermined time period for a continuation time of the power-generation driving prohibition of said electric motor, and when the open-circuit voltage value of said main battery becomes less than a canceling voltage value that is less than the set voltage value within the set predetermined time period, then after the set predetermined time period passes, said controller controls to cancel the power-generation driving prohibition of said electric motor, and meanwhile, when the open-circuit voltage value of said main battery does not become less than the canceling voltage value within said set predetermined time period, then after the open-circuit voltage value has become less than the canceling voltage value, said controller controls to cancel the power-generation driving prohibition of said electric motor.

4. A control apparatus for a hybrid vehicle having an engine and an electric motor disposed therein, the electric motor having both driving and power-generating functions and being directly connected to the engine mounted on the hybrid vehicle, comprising:

a main battery which supplies driving electric power to said electric motor and is charged by generated electric power from power-generation driving of said electric motor;

a temperature sensor for detecting a temperature of the main battery; and a controller that controls to prohibit power-generation driving of said electric motor to charge said main battery when the main battery temperature detected by said temperature sensor is less than a set temperature, when said electric motor is power-generation driving to charge said main battery, when an open-circuit voltage value of said main battery exceeds a set voltage value, and then, when a generated electric power value of said electric motor is less than a set electric power value, wherein said controller sets both first and second predetermined set time periods for a continuation time of the power-generation driving prohibition of said electric motor, and when the open-circuit voltage value of said main battery becomes less than the canceling voltage value that is lower than the set voltage value within the first set time period during the power-generation driving prohibition of said electric motor, then said controller controls to cancel the power-generation driving prohibition of said electric motor, and when an open-circuit voltage value of said main battery becomes less than a canceling voltage value within the second set time period that is longer than the first set time period, then after said second set time period passes, said controller controls to cancel the power-generation driving prohibition of said electric motor, meanwhile, when the open-circuit voltage value of said main battery does not become less than the canceling voltage value within the second set time period, then after the open-circuit voltage value has become less than the canceling voltage value, said controller controls to cancel the power-generation driving prohibition of said electric motor.

5. The control apparatus for a hybrid vehicle as defined in claim 1, wherein said controller controls to cancel the power-generation driving prohibition and to return to usual control mode when a driving order for said electric motor to provide power to the engine issues during the power-generation driving prohibition of said electric motor.

6. The control apparatus for a hybrid vehicle as defined in claim 2, wherein said controller controls to cancel the power-generation driving prohibition and to return to usual control mode when a driving order for said electric motor to provide power to the engine issues during the power-generation driving prohibition of said electric motor.

7. The control apparatus for a hybrid vehicle as defined in claim 3, wherein said controller controls to cancel the power-generation driving prohibition and to return to usual control mode when a driving order for said electric motor to provide power to the engine issues during the power-generation driving prohibition of said electric motor.

8. The control apparatus for a hybrid vehicle as defined in claim 4, wherein said controller controls to cancel the power-generation driving prohibition and to return to usual control mode when a driving order for said electric motor to provide power to the engine issues during the power-generation driving prohibition of said electric motor before the second set time period.

9. A hybrid vehicle comprising:

an engine;

an electric motor directly connected to the engine, the electric motor having both driving and power generating functions;

a main battery that supplies driving electric power to and is charged by generated electric power from said electric motor;

a temperature sensor for detecting a temperature of said main battery;

a controller that provides a power generation prohibition preventing said electric motor from charging said main battery when: 1) the main battery temperature is less than a set temperature; 2) said electric motor is power generating to charge said main battery; 3) a measured open-circuit voltage value of said main battery is greater than a set open-circuit voltage value; and 4) an electric power value generated by said electric motor is less than a set electric power value.

10. The hybrid vehicle of claim 9, wherein said controller cancels the power generation prohibition when the measured open-circuit voltage value is less than a canceling voltage value, the canceling voltage value being less than the set open-circuit voltage value.

11. The hybrid vehicle of claim 9, wherein said controller sets a predetermined time period for a continuation of the power generation prohibition of said electric motor, the power generation prohibition continuing for the predetermined time period unless a drive order requesting the electric motor to drive the hybrid vehicle is received.

12. The hybrid vehicle of claim 11, wherein after the predetermined time period, said controller cancels the power generation prohibition when the measured open-circuit voltage value of the battery is less than a canceling voltage value.

13. The hybrid vehicle of claim 9, wherein said controller sets first and second predetermined time periods for a continuation of the power generation prohibition of said electric motor, the power generation prohibition continuing for the first predetermined time period unless a drive order requesting the electric motor to drive the hybrid vehicle is received or the measured open-circuit voltage value of the battery is less than a canceling voltage value.

14. The hybrid vehicle of claim 13, wherein after the first predetermined time period, the power generation prohibition of said electric motor continues for the second predetermined time period.

15. The hybrid vehicle of claim 14, wherein after the second predetermined time period, the power generation prohibition of said electric motor continues until the measured open-circuit voltage value of the battery is less than the canceling voltage value.

16. The hybrid vehicle of claim 9, wherein said engine comprises an internal combustion engine.

17. The hybrid vehicle of claim 10, wherein said engine comprises an internal combustion engine.

* * * * *